US010086940B2

(12) United States Patent
Alkaher et al.

(10) Patent No.: US 10,086,940 B2
(45) Date of Patent: Oct. 2, 2018

(54) METHOD AND SYSTEM FOR DELIVERING BIODEGRADABLE SHELLED PORTIONS

(71) Applicant: Elbit Systems Ltd., Haifa (IL)

(72) Inventors: Shlomo Alkaher, Haifa (IL); Dan Lewitus, Herzliya (IL); Amos Ophir, Zikhron Ya'acov (IL); Ana Lea Dotan, Ramat-Gan (IL); Yoram Ilan Lipovsky, Tel Aviv (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 15/632,872

(22) Filed: Jun. 26, 2017

(65) Prior Publication Data

US 2017/0320573 A1 Nov. 9, 2017

Related U.S. Application Data

(63) Continuation-in-part of application No. PCT/IL2016/051385, filed on Dec. 27, 2016.

(30) Foreign Application Priority Data

Dec. 27, 2015 (IL) ........................................ 243356

(51) Int. Cl.
*B64D 1/02* (2006.01)
*B32B 23/04* (2006.01)

(52) U.S. Cl.
CPC ................ *B64D 1/02* (2013.01); *B32B 23/04* (2013.01); *B32B 2250/03* (2013.01); *B32B 2317/18* (2013.01); *B32B 2439/00* (2013.01)

(58) Field of Classification Search
None
See application file for complete search history.

(56) References Cited

U.S. PATENT DOCUMENTS 3,002,428 A 10/1961 Johnstone
4,318,328 A 3/1982 Rona
(Continued)

FOREIGN PATENT DOCUMENTS

CN 1812912 8/2006
CN 1876203 12/2006
(Continued)

OTHER PUBLICATIONS

Search Report of International Application No. PCT/IB2012/054058 dated Jan. 16, 2013.
(Continued)

*Primary Examiner* — Nicholas K Wiltey
(74) *Attorney, Agent, or Firm* — Pearl Cohen Zedek Latzer Baratz LLP

(57) ABSTRACT

A method of delivering over the air, shelled portions of fluids or granular substances containing effective ingredients, to a target, includes the following stages: selecting a type and a size of the shelled portions containing the required effective ingredients, based on mission parameters and physical data of a scene containing the target; conveying the shelled portions to a delivery point, based on the mission parameters and the physical data; and ballistically delivering the shelled portions towards the target, wherein the shelled portions comprise fluids or granular substances covered by shells that provide the shelled portions a ballistic coefficient that is significantly higher than a ballistic coefficient of similar portions without the shells.

20 Claims, 7 Drawing Sheets

(56) References Cited

U.S. PATENT DOCUMENTS

| | | | | |
|---|---|---|---|---|
| 5,091,262 | A | 2/1992 | Knott et al. | |
| 5,108,807 | A | 4/1992 | Tucker | |
| 5,507,350 | A | 4/1996 | Primlani | |
| 5,668,346 | A | 9/1997 | Kunz et al. | |
| 5,894,892 | A | 4/1999 | Huang | |
| 5,984,892 | A | 11/1999 | Bedingham | |
| 7,735,752 | B1 | 6/2010 | Songer et al. | |
| 7,735,781 | B1 | 6/2010 | Moritz et al. | |
| 8,783,185 | B2 | 7/2014 | Jacobsen et al. | |
| 2002/0094444 | A1 | 7/2002 | Nakata et al. | |
| 2003/0010185 | A1 | 1/2003 | O'dwyer | |
| 2006/0011355 | A1 | 1/2006 | Cleary et al. | |
| 2007/0001156 | A1* | 1/2007 | Toreki, III | A62D 1/0064 252/601 |
| 2007/0042207 | A1 | 2/2007 | Berger et al. | |
| 2008/0146109 | A1* | 6/2008 | Howard | B32B 27/28 442/181 |
| 2009/0072182 | A1* | 3/2009 | Berger | A62D 1/0042 252/3 |
| 2009/0120653 | A1 | 5/2009 | Thomas | |
| 2009/0179069 | A1 | 7/2009 | Schmidt et al. | |
| 2009/0205845 | A1 | 8/2009 | Hoffman | |
| 2009/0302164 | A1 | 12/2009 | Fox | |
| 2009/0321094 | A1 | 12/2009 | Thomas | |
| 2011/0133036 | A1 | 6/2011 | Goddard et al. | |
| 2013/0029604 | A1* | 1/2013 | Saito | H04W 76/028 455/41.2 |
| 2017/0216638 | A1* | 8/2017 | Asayama | A62C 3/025 |

FOREIGN PATENT DOCUMENTS

| | | |
|---|---|---|
| FR | 2178461 | 11/1973 |
| FR | 2791603 | 10/2000 |
| WO | WO 01/87421 | 11/2001 |
| WO | WO 03/063966 | 8/2003 |
| WO | WO 2006/083558 | 8/2006 |
| WO | WO 2008003671 | 1/2008 |
| WO | WO 2010/144431 | 12/2010 |

OTHER PUBLICATIONS

Office Action of CN Application No. 2012800501678, dated Apr. 1, 2015.

Office Action of U.S. Appl. No. 13/569,589, dated Oct. 2, 2014.

Final Office Action of U.S. Appl. No. 13/569,589, dated Apr. 17, 2015.

Search Report of International Application No. PCT/IL2016/051385, dated Apr. 23, 2017.

Martin, O. et al. "Properties of biodegradable multilayer films based on plasticized wheat starch." Starch—Stärke, vol. 53, Issue 8, Aug. 21, 2001, pp. 372-380.

Baljit Singh and Nisha Sharma "Mechanistic implications of plastic degradation" Department of Chemistry, Himachal Pradesh University, Shimla 171 005, India, Jun. 21, 2007, Polymer Degradation and Stability 93 (2008) pp. 561-584.

Anne Ammalaa, "An overview of degradable and biodegradable polyolefins", Progress in Polymer Science 36 (2011) 1015-1049.

Office Action for Israeli Application No. 243356, dated Jan. 15, 2018.

Final Office Action for U.S. Appl. No. 13/569,589, dated Oct. 31, 2017.

Office Action for U.S. Appl. No. 15/632,558, dated Aug. 18, 2017.

* cited by examiner

METHOD AND SYSTEM FOR DELIVERING BIODEGRADABLE SHELLED PORTIONS

CROSS REFERENCE TO RELATED APPLICATIONS

This application is a Continuation-In-Part of International Application No. PCT/IL2016/051385, filed Dec. 27, 2016, which claims priority from Israeli Patent Application No. 243356, filed Dec. 27, 2015, all of which are incorporated in their entirety herein by reference.

FIELD OF THE INVENTION

The present invention relates to the field of delivery of fluids over the air and, more particularly, to a method and system for remote ballistic delivery of fluids filled in biodegradable packages using aerial vehicles.

BACKGROUND OF THE INVENTION

Aerial vehicles are used today in various missions of delivery of fluids and granular substances from the air. In some cases, delivery from the air is the only option either due to limited access or because of the effectiveness of the air delivery in covering large areas in a short time. Non-limiting examples for such mission include firefighting, fertilizing, cooling nuclear reactors as well as using herbicides and pesticides.

The main challenge in delivering fluids and granular substances, due to their particle nature, is the tendency of these materials to be greatly affected by air resistance. Specifically, large portions of the fluids transform into an aerosol which drifts by the wind and never reaches the target on the ground or above it. The aerosol may also affect the aerial vehicle or people on board it or on the ground. In a case that the fluid contains harmful ingredients, the aerosol or other buoyant particles can cause health problems or harm the aerial vehicle. Solid granular substances suffer from similar limitations and, while they do not transform into aerosol, their air resistance is sufficiently high such that they may lose their ballistic characteristics.

In order to avoid the aforementioned aerosol effect, aerial flights today are performed at low altitudes (less than 100 feet above ground). Such a flight profile is very risky, and requires special aircrafts and special pilot skills. Because of those high requirements, current aerial missions can be performed nowadays only at day time and they are stopped altogether during the night, or in strong wind and low visibility conditions, such as smoke, fog or dust.

FIG. 1 is a schematic illustration of an aerial vehicle 10 discharging fluid 40 from the air towards targets 20 such as trees on the ground 30. Due to the aforementioned air resistance, some portions 50 of the fluid are cut from the main bulk of fluid 40 while other portions of fluid 40 transform into aerosol 60. As the aerosol loses its ballistic character it becomes very difficult, if not impossible, to deliver effective amounts of fluid 40 to ground 30 or targets 20. It is noted that the aforementioned problem becomes ever more challenging when air vehicle 10 is located higher up in the sky.

After hitting the ground, a material that will not be consumed by fire or be used as a fertilizer may contaminate the ground. Accordingly, any attempt to encapsulate the fluid inside specially designed packages (e.g., shells) must take into consideration the environmental effect to these packages. Accordingly, materials such as polymers that can be disintegrated and/or undergo biodegradation may be considered.

Disintegration involves breaking of at least some of the bonds between the polymer chains due to the exposure of the polymer to UV light (e.g., UV light coming from the sun), thus causing disintegration of the polymeric package into small pieces. Such small pieces, if not further decomposed, may remain in garbage yards or shelled portions for years. Composting or underground burial involves complete fragmentation of the polymer into carbon dioxide, water, inorganic compounds and biomass, leaving no distinguishable or toxic residues.

Composting processes are conducted at closed shelled portions, under controlled environment having controlled temperature and humidity levels, while underground burial requires the use of heavy machinery to cover the plastic residues. The composting process, or the underground degradation process, involves a digestion of the polymer by microorganisms into harmful compounds. Such polymers usually contain large amount of digestible material such as starch acting as the "substrate" for the microorganisms.

Full disintegration and fragmentation of a polymeric package or polymeric shells into carbon dioxide, water and other harmless compounds in open air, on the ground is very desirable. Furthermore, when being burned either accidentally or on-purpose it may be desirable that the product of the burning of the polymeric package will not contain any harmful gases.

BRIEF SUMMARY OF THE INVENTION

Some embodiments of the present invention provide a method of delivering over the air, shelled portions containing effective ingredients to a target. The method includes the following stages: selecting a type and a size of the shelled portions containing the required effective ingredients, based on mission parameters and physical data of a scene containing the target; conveying the shelled portions to a delivery point, based on the mission parameters and the physical data; and ballistically delivering the shelled portions towards the target, wherein the shelled portions comprise fluids or granular substances covered by biodegradable shells that provide the portions a ballistic coefficient that is significantly higher than a ballistic coefficient of similar portions without the shells.

The biodegradable shells may include: a first layer comprising polysaccharide at a weight % of up to 50% and a polymer matrix, the first layer being configured to form a water barrier when in contact with water; a second layer comprising a polysaccharide at a weight % of at least 40% and a polymer matrix; and a third layer comprising polysaccharide at a weight % of up to 50%, a polymer matrix and an additive configured to accelerate disintegration of the polymeric shell when exposed to natural day light, the third layer being configured to form a water barrier when in contact with water.

The mission parameters may include any of the following: the required type of effective ingredients, the height of the target above sea level, the required height above the target above ground level (AGL), the required velocity of the aerial vehicle, the footprint and the distribution at the target, and meteorological effects such as wind velocity and direction around the aerial vehicle at the delivery point and/or the wind velocity and direction around the target.

Advantageously, some embodiments of the present invention provide a solution to the aforementioned risky flight profile in order to address the aerosol effect. Some embodiments of the present invention ensure safe flight in high altitude for common commercial transport airplanes and further enable performance of the mission at day or at night and in all weather conditions. Furthermore, some embodiments of the present invention may provide a solution to the aforementioned contamination effect that the shelled portions may have when they hit the ground. The shelled portions that include the biodegradable shells may undergo biodegradation on the ground responsive to an exposure to free air and natural day light. Other embodiments of the present invention may be related to a method of delivering shelled portions.

The method may include: loading the shell portions into an air vehicle and ballistically delivering the shelled portions from the air vehicle to a target. In some embodiments, the shell portions may include flexible biodegradable shells containing at most 300 gm of fluids. In some embodiments, the flexible biodegradable shells may be made from a multilayered flexible biodegradable sheet containing polysaccharides at each layer of the multilayered flexible biodegradable sheet. In some embodiments, ballistically delivering the shelled portions may include: deriving physical data associated with the scene which includes the target from one or more sources, wherein at least some of the sources are independent of each other, receiving mission parameters including the height and speed of the vehicle at the delivery point and ballistically delivering the shelled portions to the target using calculations based on the physical data and the mission parameters.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION OF THE INVENTION

Figure 1:
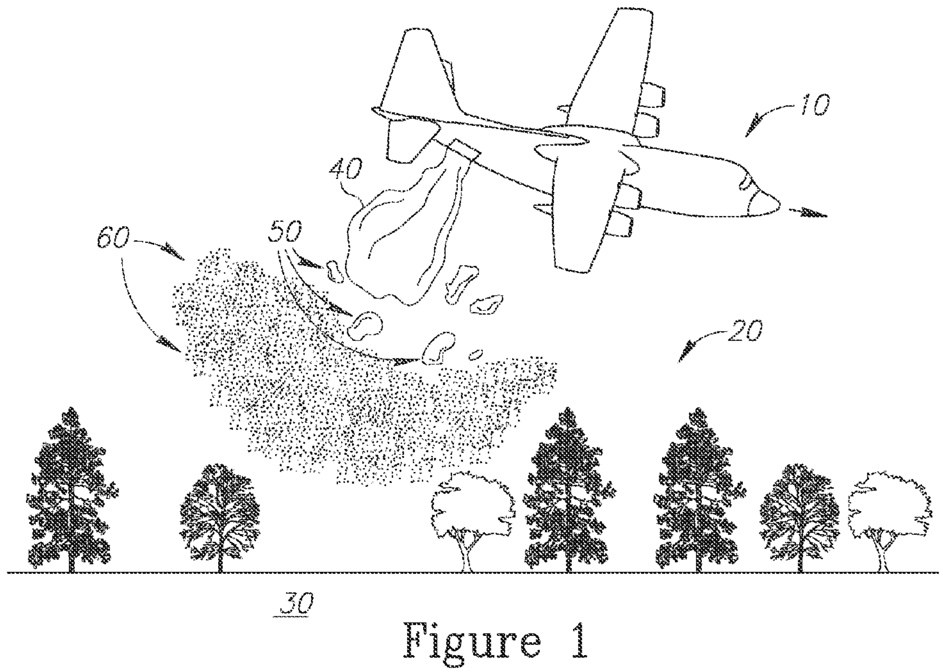
FIG. 1 is a schematic diagram showing fluid delivery from the air according to the existing art.

Prior to the detailed description being set forth, it may be helpful to set forth definitions of certain terms that will be used hereinafter.

The term "shelled portions" as used herein refers to portions of the effective substance, either in the form of a fluid, powder or granules that are packed by a shell, preferably but not necessarily a flexible shell and/or a flexible biodegradable shell, that is characterized by a ballistic coefficient that is significantly higher than the ballistic coefficient of similar portions of the effective substance or any other material which are not packed by the shells. The shelled portioned are manufactured so that they resemble ballistic ammunition in size, shape and weight so as to preserve ballistic properties of the shelled portions which contribute to the repeatability of the aerial delivery of theses shelled portions. These shelled portions may weigh each approximately 100 to 300 grams. The restrictions on the weight stem from the fact that proposed shelled portions should not be lethal upon impact with humans or animals.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
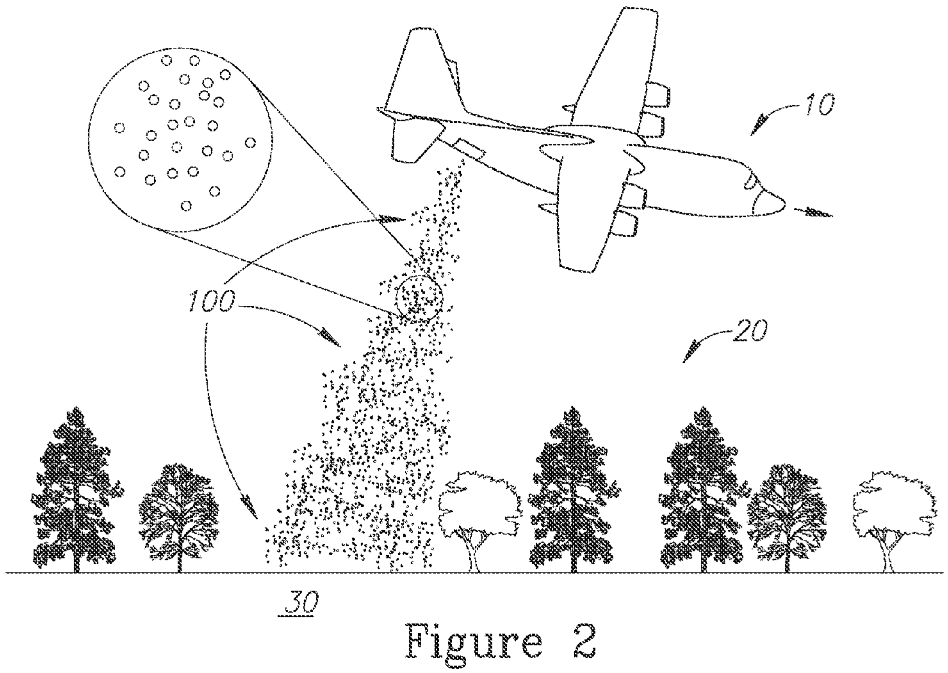
FIG. 2 is a schematic diagram showing fluid and granular substances delivery from the air according to some embodiments of the present invention.

FIG. 2 is a schematic illustration of an aerial vehicle 10 discharging loads of shelled portions 100 of either fluids or granular substances from the air towards targets 20 such as trees on the ground 30. As shown, the shelled portions 100 are selected to be of a size that is sufficient to maintain their ballistic character. The actual size of theses shelled portions is very much a function of the height from which these shelled portions are projected, the weather conditions, and the purpose of the delivery of the fluid or granular substance. It is understood that a diameter of 0.5 cm may be reasonable for low altitude missions (tens of meters), whereas shelled portions having a diameter of several centimeters will be required for higher altitudes (over 100 meter). It is noted that the aforementioned values are for demonstrative purposes only and should not be regarded as limiting the invention.

Consistent with some embodiments of the present invention, the shelled portions of effective ingredients are selected on a per-mission basis to have the size, weight and packaging material so that they are non-harmful upon impact with human beings or any objects at the target are, whenever avoiding harmful impact is a consideration. For example, the packaging material may be a flexible biodegradable polymeric shell made from a multilayered flexible biodegradable shell (e.g., shell 130 illustrated in FIGS. 12 and 13) containing polysaccharides at each layer of the multilayered flexible biodegradable sheet. Put differently, both the selection of the shelled portion and the ballistic delivering of the shelled portions to a target are carried out in view of avoiding harmful impact of the shelled portion in a case of human presence or any object presence near or at the target. For example, the shell portions may include flexible biodegradable shells containing at most 300 gm of fluids, in order to avoid any harmful impact. In order to protect the environment, the materials of the shells may be selected such that they do not pollute the ground or the air upon falling and breaking at the target. In some embodiments, the shells may undergo biodegradation on the ground responsive to an exposure to free air and natural day light.

Consistent with some embodiments of the present invention, the shelled portions are designed such that a dissemination effect of the fluid or granular substance is achieved by tearing, opening, or breaking of the shells upon hitting the target or object above the target.

The effective ingredients inside the shelled portion may be determined and selected on an ad hoc basis. For firefighting, a fire extinguishing material may be used. Pesticides, herbicides and fertilizers may be used in agricultural applications. The shell should merely keep the fluid or granular substance in a shape, possibly made of a flexible material, usually but not necessarily a sphere. In some embodiments, the effective ingredients may include any type fluids that include fire retardant substances such as firefighting foams and fire-retardant gels. In some embodiments, the effective ingredient may be water (e.g., sweet water, sea water, purified water and the like)

In accordance with some embodiments of the invention, the shells of the shelled portions 100 may be made of bio degradable materials, possibly compostable materials. By being selected to be biodegradable materials, the shells are able to break down into carbon dioxide, water and biomass once reaching the target. Advantageously, shells made of biodegradable materials, may not produce any toxic material and very much like compost should be able to support plant life. In some embodiments, the shells may be made from plant materials such as corn, potato, cellulose, soy and sugar, as disclosed and discussed with respect to FIGS. 12-14. In some embodiments, the shells are made of materials that break down possibly but not exclusively through the action of a naturally occurring microorganism over a period of several weeks—a period that is substantially shorter than the decomposing period of biodegradable materials.

It is, however, to be understood that other materials which are not biodegradable may be also used for shells, including but not limited to polyester and the like. In some embodiments, the selection of the material for the shells is selected so that in the decomposing or breaking down process, or burning on a fire, neither toxic gases nor toxic fumes are released. The decomposing process may occur on the ground and may be accelerated by bacteria on the ground.

Figure 3:
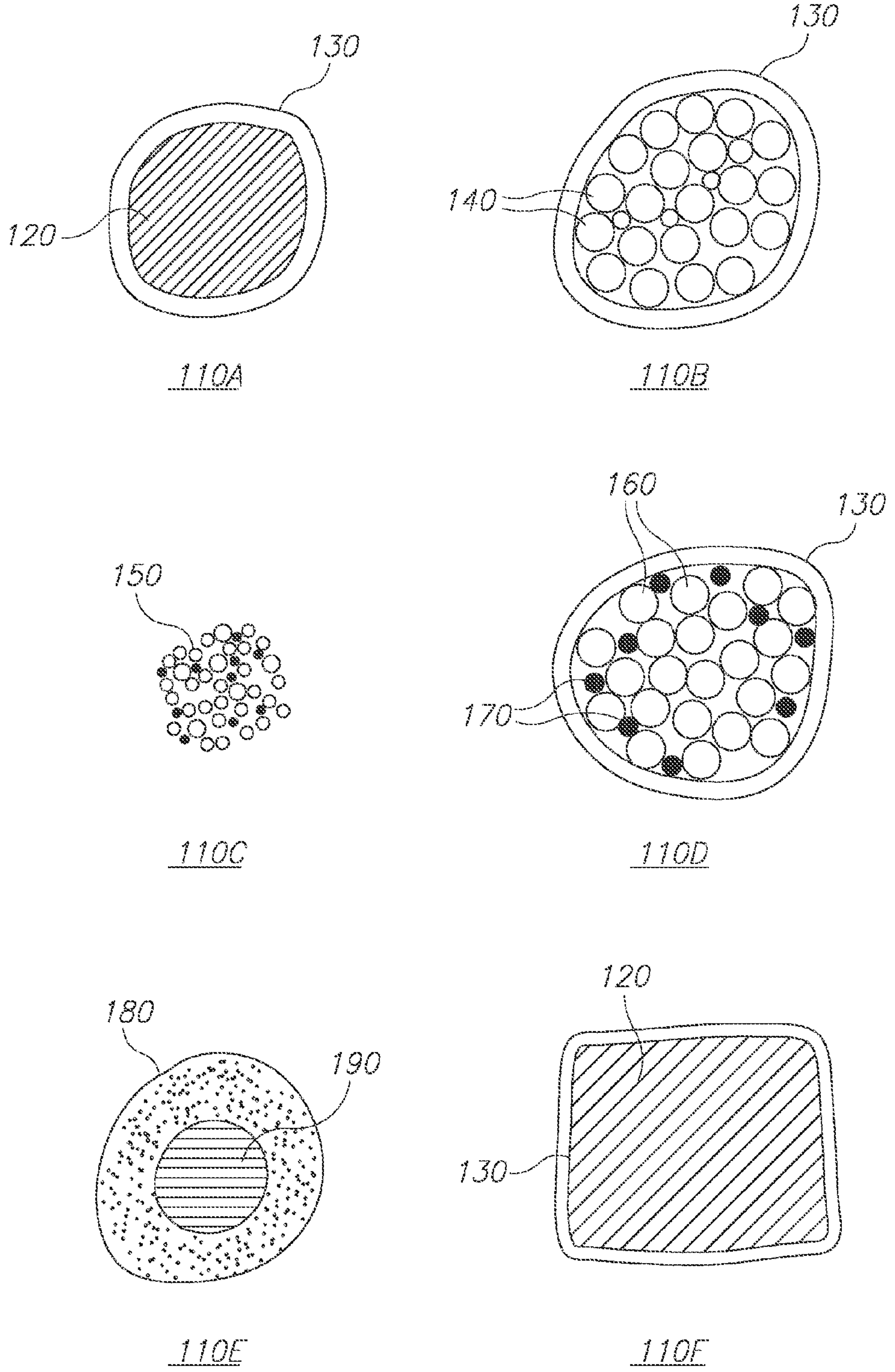
FIG. 3 show cross-sectional views of several non-limiting examples for the shelled portions of the fluid or the granular substance according to some embodiments of the present invention.

FIG. 3 show cross-sectional views of several non-limiting examples for the shelled portions of the fluid or the granular substance according to some embodiments of the present invention. Shelled portion 110A includes a shell 130 (e.g., a biodegradable shell) and a homogenous fluid 120 that can be selected in accordance with the desired effect at the target. Shelled portion 110B includes a shell 130 (e.g., a biodegradable shell) and a granular substance 140 that can be either solid or frozen fluid or ice slurry. In a case of frozen fluid, the shelled portion 11B may be used to cool down the target on top of other effects. For example, iced granular substance may be tightly packed within a shell and be used to cool a nuclear reactor on the ground. Portion 110C may contain a portion (with or without a shell) of granular substance pressed together. Two or more ingredients may be used in combination so that a different effect is achieved at the target (e.g., due to mixing) or prior to hitting the target due to rotational forces. Additionally, at least one of the substances in the packed shell may be arranged to generate a gaseous substance or foam upon impact at target.

Consistent with some embodiments, shelled portion 110D includes a shell 130 (e.g., a biodegradable shell) and a first granular substance 160 put together with a second granular substance 170, both of which can be either solid or frozen fluid. In one embodiment, first granular substance 160 may inflate or generate a gaseous substance at the target thus facilitating the propagation of second granular substance 170.

Consistent with some embodiments, shelled portion 110E includes a shell 180 that may be in the form of a frozen fluid and another fluid or granular substance 190 contained within. The shell may be made by an environmental friendly material that disintegrates or evaporated at the target. The shell may also be selected for timed application of the effective ingredient at the target, for example by selecting a biodegradable material for the shell that disintegrated after a predefined time and only then fluid or granular substance 190 is applied to the target. The shell may also be configured to break or open while still in the air prior to the impact with the target so that release of the effective ingredients starts well before the impact so that is some cases the impact is with an empty or nearly empty shell.

Consistent with some embodiments, shelled portion 110F includes a shell 130 (e.g., a biodegradable shell) and fluid or granular substance 120 wherein the shell is shaped as a cube or a prism so that packaging is easier at the expenses of air resistance.

Figure 4:
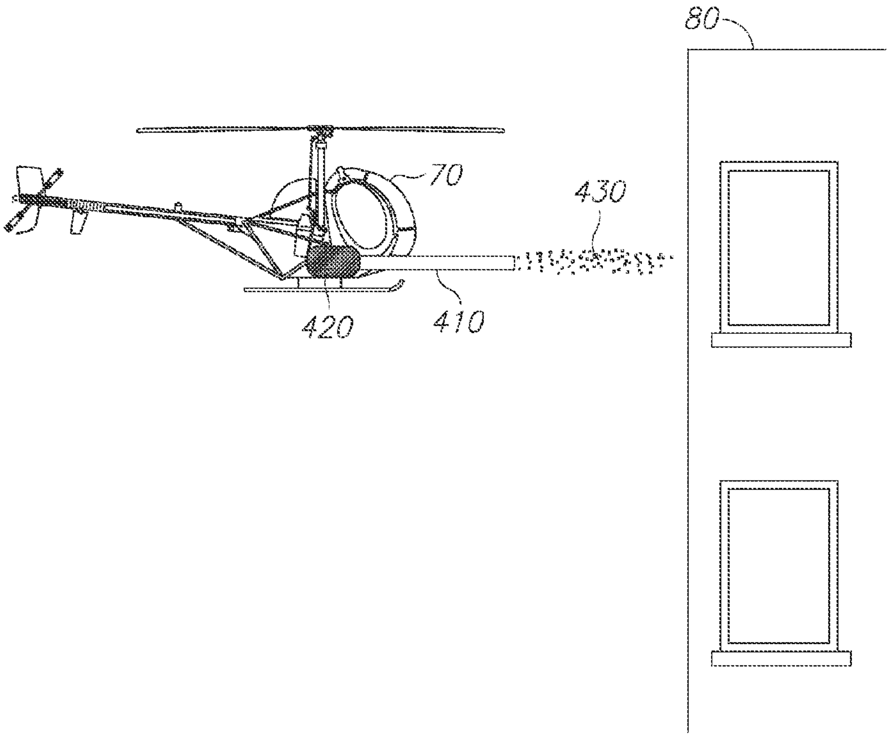
FIG. 4 is a schematic diagram illustrating one aspect according to some embodiments of the present invention.

FIG. 4 is a schematic diagram illustrating one aspect according to some embodiments of the present invention. An aerial vehicle 70 is shown delivering a load of shelled portions 430 in an upward forward direction towards a target 80. Shelled portions 430 are stored as a payload 420 on aerial vehicle 70 and delivered via a tube 430. It is well understood that shelled portions 430 need not necessarily be delivered from an aerial vehicle as long as they are delivered from a certain height and over the air (e.g., from a tower or from a tube on the ground using pressure).

When dropped on burned trees or vegetation in a wildfire, the shell may break up or being opened up at about 30 feet above the flames and dispense the fluid or granular substance in the shells evenly on the target.

Figure 5:
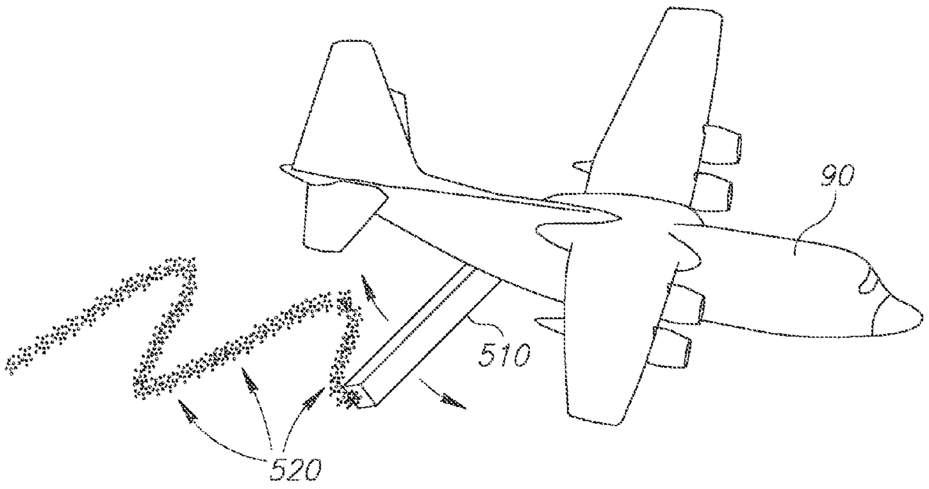
FIG. 5 is a schematic diagram illustrating one aspect according to some embodiments of the present invention.

FIG. 5 is a schematic diagram illustrating one aspect according to some embodiments of the present invention. An aerial vehicle 90 is shown delivering a load of shelled portions 520 using a sleeve 510 configure to move at any direction in order to control the coverage area of load of shelled portions 520. It is understood that various other methods of discharging shelled portions 520 may be used.

Figure 6:
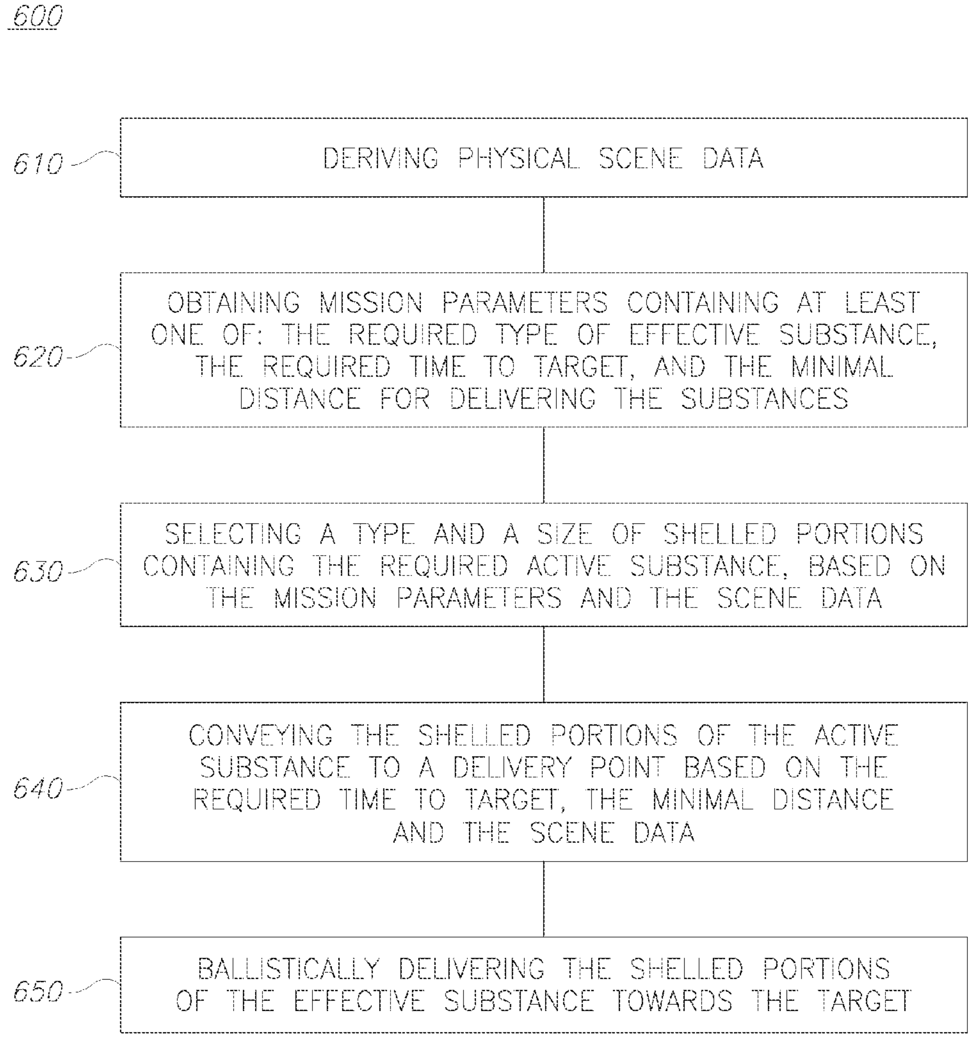
FIG. 6 is a high level flowchart illustrating a method according to some embodiments of the present invention.

FIG. 6 is a high level flowchart illustrating a method according to some embodiments of the present invention. Method 600 takes advantage of the aforementioned shelled portions of various shapes, sizes and contents, and describes a generalized procedure that enables to tailor the specific shelled portions of substance to the requirements of a specific mission and further based on physical attributes (e.g., physical data) of the scene over the target. Any mission of delivery from the air of fluids or granular substance may impose different restrictions such as the optimal location for the point of delivery, timing considerations as well as safety constraints. At least some of the stages of method 600 may be performed by a computer processor included in a system according to some embodiments of the invention. Thus, method 600 may start up with the stage of deriving physical scene data 610, for example, by the computer processor. The physical scene data may be derived from many sources and types of data such as optical, thermal, electromagnetic, and the like. The method may go on to the stage of obtaining the mission parameters 620, for example, by the computer processor, possibly from a user who plans the mission. These parameters may include, for example: the required type of effective ingredients, the required density of the effective substance at the target, the elevation over target, the required time to target, and sometimes minimal distance for delivering the substances possibly due to safety reasons. In some embodiments, the effective ingredients may include any type of liquids that include fire retardant substances such as fire-fighting foams and fire-retardant gels. In some embodiments, the effective ingredient may be water (e.g., sweet water, sea water, purified water and the like). Then, the method goes on to the stage of selecting 620, for example, by the computer processor, a type and a size of shelled portions containing the required effective ingredients, based on the mission parameters. The method then goes on to the stage of conveying 630, for example, by an airborne dispenser controlled by the computer processor, the shelled portions of the effective substance to a delivery point, based on the required time to target and the minimal distance. In a case of delivery using an aerial vehicle, the delivery point is where the aerial vehicle discharges the shelled portions. Finally, the shelled portions are ballistically delivered 640 towards the target.

In some embodiments, a method such as method 600 or any other method of delivering shelled portions according to some embodiments of the invention may include ballistically delivering the shelled portions to the target. The ballistically delivering may include: deriving physical data associated with the scene which includes the target from one or more sources, wherein at least some of the sources may be independent of each other. For example, such receiving physical data may include the altitude, the embossment, plants and buildings covering the target area and the like. The physical data may be received from maps and/or aerial photographs stored in databases, aerial photographs received from cameras of aerial vehicle 90 or any other aerial vehicle and the like. The method may further include using the obtained mission parameters including the height and speed of the vehicle at the delivery point to ballistically delivering the shelled portions to the target using calculations based on the physical data and the mission parameters.

As will be appreciated by one skilled in the art, some of the steps of method 600 may be embodied as a computer implemented method or computer program product and may be executed by the computer processor. Accordingly, aspects of some of the steps of method 600 may take the form of an entirely hardware embodiment, an entirely software embodiment (including firmware, resident software, micro-code, etc.) or an embodiment combining software and hardware.

The delivery may be in such a way that yields a specified footprint at impact height over the target. The delivery may be carried out in various dispensing manners that are selected as to density and form of distribution of the shelled portions. The footprint is thus an effective metric by which the type of delivery may be carried out.

It is to be understood that the stage of ballistically delivering the shelled portions is carried out naturally once the physical conditions, specifically the size of the shelled portions, are met. It is further understood that by carefully planning the mission and selecting the appropriate type of shelled portions, the specified targets may be reached in the required timing and the required amount of the effective ingredients. The selecting and the planning may be optimized in accordance with the existing variety of the shelled portions and further by optimization methods known in the art in different fields.

In accordance with some embodiments of the present invention, the footprint of the shelled portions at the target is controllable and can be planned on a per mission basis. This is due to the repeatability of delivery of the shelled portions, achieved, as explained above by the high ballistic coefficient of the shelled portions. In order to achieve this end, the shelled portions may be homogenous in size, shape and weight. This homogeneity results in a similar ballistic behavior for all shelled portions of a common type. Then, in operation, by selecting mission parameters such as the height and speed of the aerial vehicle at the delivery point, the footprint of the shelled portions at the target can be planned and predicted.

Figure 7:
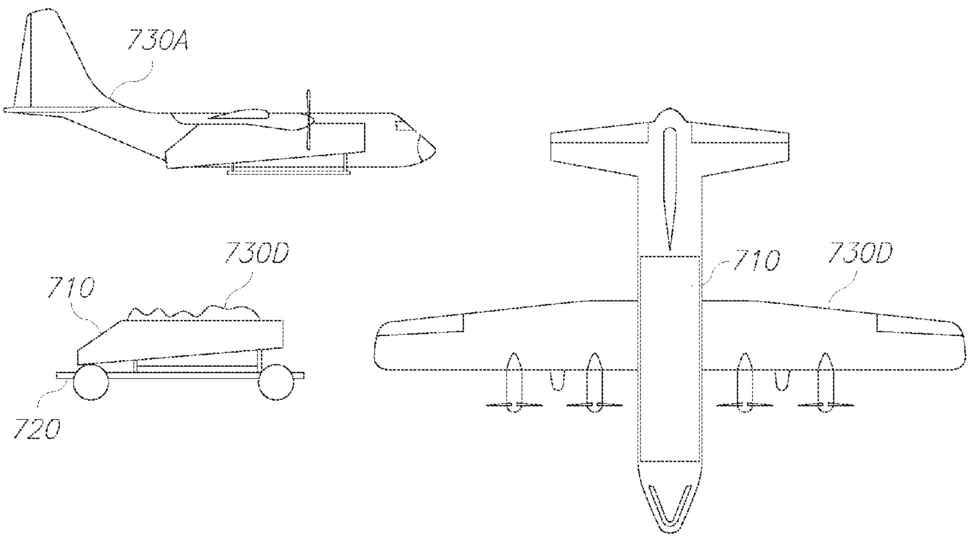
FIG. 7 is a schematic diagram showing an exemplary embodiment of an airborne dispenser of the shelled portions of fluids and granular substances in accordance with some embodiments of the present invention.

FIG. 7 is a schematic diagram showing an exemplary embodiment of an airborne dispenser of the shelled portions of fluids and granular substances in accordance with some embodiments of the present invention. Airborne dispenser 710 is shown on a carriage 720 and further in a cross section within an airplane 730A and in a top view of an airplane 730B. As illustrated, carriage 720 enables the easy loading of dispenser 710 into any aerial vehicle without further adjustments. Dispenser 710 is shaped and configured to be inserted, possibly in modular sections 720 so that the volume of the shelled portions is tailored to the planned mission as well as the carrying capacity of the aerial vehicle. In some embodiments, dispenser 720 may be entered in a matter of few minutes to any standard aircraft and thus convert the standard aircraft into an aircraft that is capable for ballistic delivery of the shelled portions. In order to preserve current delivery methods, dispenser 710 may be configured for dual use so that in one configuration the dispenser is operable to carry on fluids and deliver them in the traditional manner and in another configuration the dispenser is configured to deliver some shelled portions of the present invention.

Additionally, in some embodiments of the present invention, modular sections 720 of dispenser 710 may each contain a different type of shelled portions. Dispenser 710 may be further configured to dispense on a single mission, a plurality of types of shelled portions 100 so that the selection of the types of shells and the effective substance or fluid may be selected on the fly ad so may be the aforementioned stages of method 600 discussed above. This feature may further enhance flexibility of the embodiments of the present invention.

Figure 8:
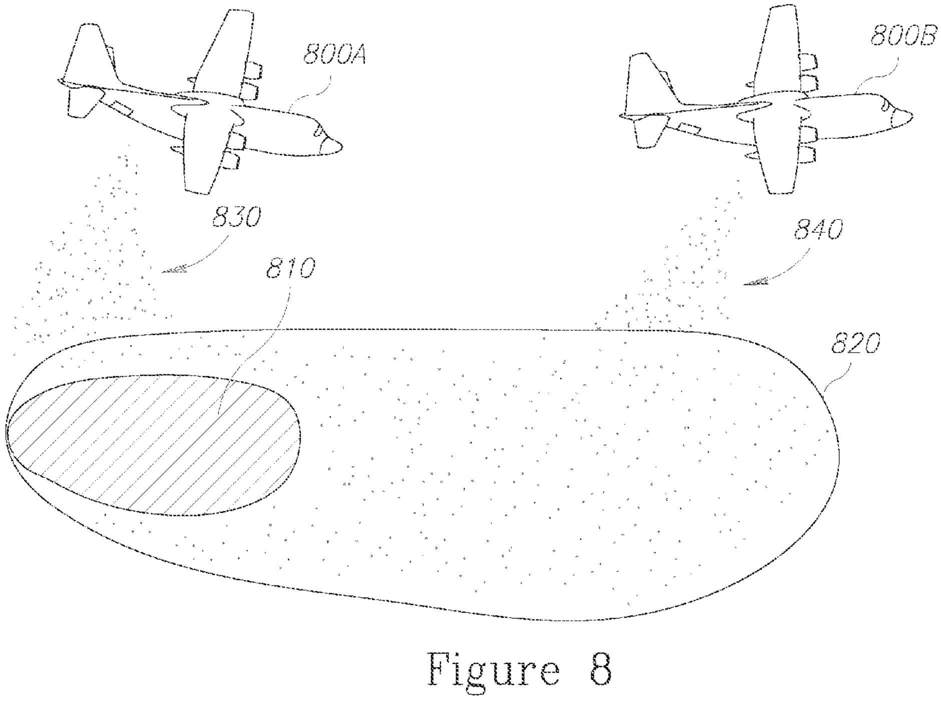
FIG. 8 is a schematic diagram showing an exemplary application of some embodiments of the present invention.

FIG. 8 is a schematic diagram showing an exemplary application of some embodiments of the present invention. The diagram shows a dynamic target on the ground which includes a first portion 810 and a second portion 820. First portion 810 may be a target of a first kind (such as active fire or an oil spill in the ocean), and a second portion 820 may be a target of a second kind (such as area soon to be caught by the fire or soon to be contaminated by the oil spill, respectively). In some embodiments of the present invention, it would be possible to tailor the appropriate type of shells and effective substance, to the different types of target as illustrated above, respectively while on a single mission (shelled portions of type 830 (e.g., made from biodegradable shell) are used for target 810 when airplane is in location 800A while shelled portions of type 840 (e.g., made from biodegradable shell) are used for target 820 when airplane is in location 800B. This feature is particularly advantageous when handling a dynamic target being a target that changes it size and its nature over a period of time of the order of a single mission. For example, fire fighting material may be used on the area already caught by fire 810, while fire retardants may be used on an area not yet caught by fire 820.

Figure 9:
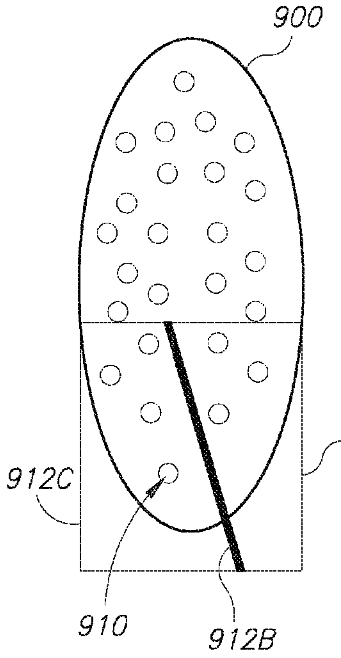
FIG. 9 is a schematic drawing illustrating yet another embodiment of the shelled portion in accordance with embodiments of the present invention.

FIG. 9 is a schematic drawing illustrating yet another example of the shelled portion in accordance with some embodiments of the present invention. Shelled portion (or pellet) 900 (e.g., made from biodegradable shell) is shown here in the shape of a hollow ellipsoid whose shell is punctured with holes such as hole 910. Pellet 900 further includes several fins 912A-912C located on one end of pellet wherein each one of the fins is slightly tilted along the longitudinal axis of pellet 900 (the tilt angle is exaggerated in the figure for illustrative purposes). Pellets such as pellet 900 may be effectively and easily filled with fluid by grouping together many pellets and submerging them in a container (e.g., within the dispenser apparatus) filled with the fluid containing the effective substance. The fluid then enters through the holes. By selecting the holes to be small enough (depending also on the properties of the fluid), dripping of the fluid is substantially avoided when the pellet is in static position. In operation, pellets are ballistically discharged from the dispenser into the air. Due to gravity forces and fins 912A-912C, pellet 900 starts rotating around its longitudinal axis in an increasing angular speed. Beyond a specific threshold of the angular speed (which can be determined, for example, by the viscosity of the fluid and the size of the holes), the fluid starts exiting or so-called being sprinkled out of pellet 900 until pellet 900 is completely emptied. Pellet 900 can be designed (e.g., size of holes, tilt angle of fins, amount and type of fluid, and the like) in combination with the delivery parameters (e.g., height over target, vehicle velocity and the like) so that pellet 900 is completely emptied prior to impact with the target so as to minimize the hit at the target.

Figure 10:
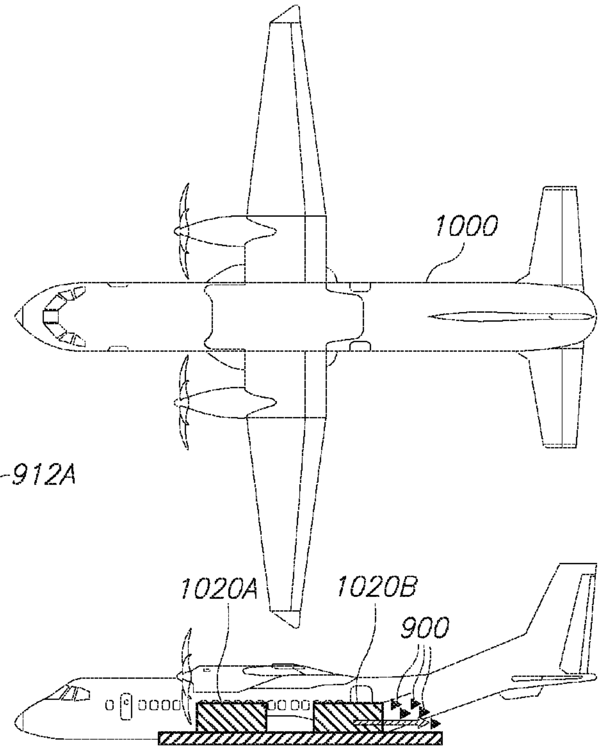
FIG. 10 is a schematic drawing illustrating an aerial vehicle equipped with a dispenser in accordance with embodiments of the present invention.

FIG. 10 is a schematic drawing illustrating an aerial vehicle equipped with a dispenser in accordance with some embodiments of the present invention. Aerial vehicle 1000 can accommodate on its bottom side, approximately near the wings, a conveyer 1010 positioned along its longitudinal axis. A container 1020 can move freely along conveyer 1010. In order to discharge the aforementioned pellets or other shelled portions discussed herein, container 1020 is being accelerated along conveyer 1010 from position 1020A to position 1020B where the container is brought to a sudden and complete stop. A door in the container is then opened and the shelled portions, or pellets, are forced ballistically out of the container.

Figure 11:
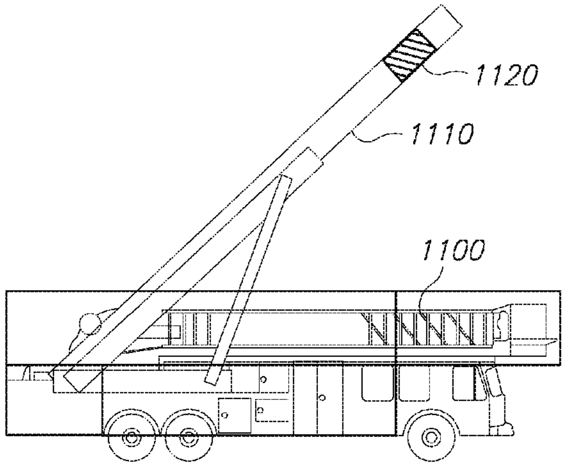
FIG. 11 is a schematic drawing illustrating a surface vehicle equipped with a dispenser in accordance with embodiments of the present invention.

FIG. 11 is a schematic drawing illustrating a surface vehicle equipped with a dispenser in accordance with some embodiments of the present invention. Similar to the dispenser described above in regards with the aerial vehicle, the dispenser of surface vehicle 1100 includes a conveyer 1110 that may be tilted to reach a specified angle, and a container 1120 that may be moved forward slowly and then brought to a complete and sudden stop. Conveyer 1010 should be sufficiently long so as to enable a minimal acceleration force applied to container 1020 so as not to affect the shells of the pellets. The exact length of conveyer 1010 is determined based on the pellet properties such as the strength of the shell and the size and number of the holes on it. The shelled portions are thus projected from container 1120 with both vertical and horizontal velocities that are selected based on the mission and the location of the target.

By mere way of example, it is to be understood that many missions may be carried out utilizing embodiments of the present invention. In one embodiment, the mission may be cooling down of nuclear reactors. In such a mission there is significant safety distance. Granular ice may be then used for the cooling. In another embodiment, the mission may be riot control in which the shelled portion may contain non-lethal stinky substance, tear causing substance and the like. In firefighting, two types may be used as explained above (firefighting and fire retardant). Similarly, in handling oil spills, one material may be used to dissolve the oil while another substance may be used to hedge the oils spill and reduce its spreading. Many more applications may benefit from advantages of the embodiments of the present invention.

In some embodiments, shelled portions (e.g., shelled portions 130, 430, 520, 830, 840 and 900) made from a biodegradable polymeric shell may have to undergo biodegradation on the ground (e.g., on the earth, on the soil), for example, after hitting the ground. The biodegradation may occur responsive to an exposure to free air and natural daylight. A biodegradable polymeric shell according to embodiments of the invention or a shelled portion made from such polymeric shell, when left on the ground in the free air, may disintegrate into $CO_2$, water and biomass. The biodegradation may be caused by digestion and/or consumption of the polymeric shells by microorganisms (e.g., bacteria), funguses or other organisms on the ground. The biodegradation process may take a relatively short period of time, for example, 6 months, 12 months, 18 months or 24 months.

Biodegradable polymeric shells according to some embodiments of the invention may include polysaccharides, for example, starch, cellulose, lignin and chitin. The polysaccharides are highly hydrophilic, and thus including such compounds in polymeric shells for forming container for aqueous solutions may raise a difficulty. In some embodiments, in order to accelerate the biodegradation, the polymeric shell may further be configured to be disintegrated into small polymeric pieces. UV light coming from the sun (during day hours) may cause degradation of the polymeric chains. This process may be accelerated by adding pro-oxidative additives to the polymer.

Therefore, biodegradable polymeric shell according to some embodiments of the invention may include two or more layers. A first layer may be configured to act as an effective water/liquid barrier for holding the water or aqueous solution (or other liquids or granular substance), and a second layer may be configured to encourage the biodegradation of the entire polymeric shell.

Advantageously, by using flexible shells and by limiting the weight of the shelled portions to 300 grams, the pellets have a dual nature as follows. For uploading and dispensing the pellets behave like a fluid and can be "poured" easily into the dispenser whenever it needs to be uploaded with several tons over a few minutes. This may be particularly advantageous in case the pellets are being produced on site.

Similarly, when letting the pellets bei dispensed from the aerial vehicle at the delivery point, they may be "poured" using only gravitational force to get them out toward the target. Once in the air, however, the shells provide the fluids within them with a high ballistic coefficient which characterize solids rather than fluids. The high ballistic coefficient guarantees ballistic behaviors which is crucial for predictability and repeatability of the delivery.

Figure 12:
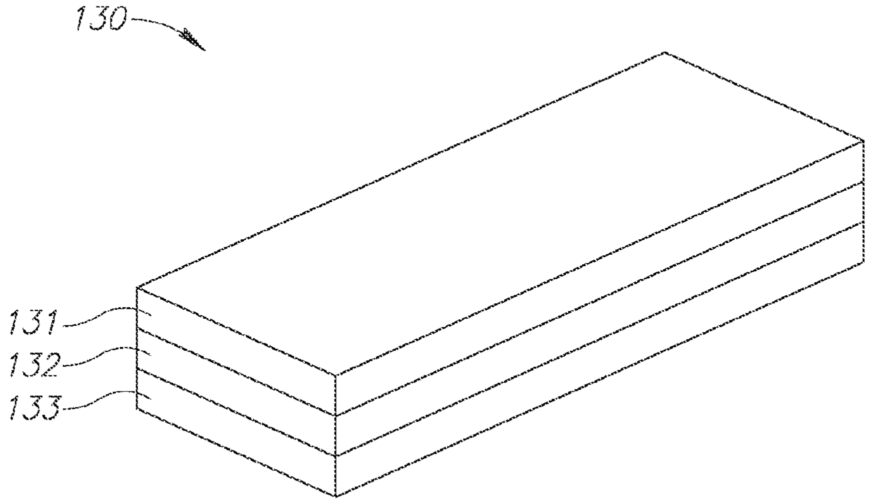
FIG. 12 is an illustration of various layers in an exemplary bio-degradable polymeric shell according to some embodiments of the invention.

FIG. 12 is an illustration of various layers in an exemplary bio-degradable polymeric shell according to some embodiments of the invention. A bio-degradable polymeric shell 130 may include a first layer 131 and a second layer 132 comprising a polysaccharide. First layer 131 may be configured to form a water barrier that, when in contact with water, may last at least one week. Biodegradable polymeric shell 130 may undergo biodegradation on the ground responsive to an exposure to free air and natural day light. Biodegradable polymeric shell 130 may be fabricated using any known method of fabricating multilayer polymeric shells. Bio-degradable polymeric shell 130 may have a total thickness of at least 30 μm, 40 μm or 50 μm or more. In some embodiments, the total thickness of polymeric shell 130 may be at most 100 μm, 150 μm, 200 μm, 300 μm, 500 μm, or 1 mm.

In some embodiments, first layer 131 may include a polymer matrix and filler. The polymer may include, for example, polyester, polyethylene, or the like and the filler may include polysaccharides, for example, starch, cellulose, lignin, chitin or any combination thereof. In some embodiments, the first layer may include up to 50 weight % of polysaccharides, for example, 40%, 30%, 25% and 10%. In some embodiments, the first layer may include at least 10%, 20% or 25% polysaccharides. In some embodiments, first layer 131 may have a thickness of at least 5 μm, for example 10 μm, 20 μm, 30 μm.

In some embodiments, the first layer may further include an additive configured to accelerate disintegration of the polymeric shell when exposed to natural day light. Such an additive may include pro-oxidative additives (also known as OXO additives). Exemplary OXO additives may include transition metal stearates that are known to induce fragmentation and degradation in polyolefins in low concentrations (e.g., 5000 PPM and less). Transition metals can switch between two oxidation states resulting in catalytic decomposition to hydroperoxides that accelerate the degradation process.

In some embodiments, the first layer may be configured to block water molecules migration for at least 3 hours, 6 hours, ½ a day, one day, 2 days, 5 days, one week or more. For example, when a first side of shell 130 comprising first layer 131 is in contact with water, first layer 131 may be configured to allow the diffusion of no more than 10% of the water from the first side to a second side of shell 130, during the at least 3 hours, 6 hours, ½ a day, one day, 2 days, 5 days, one week or more. In some embodiments, shell 130 may be in full contact with the water, such that every external portion of layer 131 may be in contact with the water. In some embodiments, the water may further apply a pressure on polymeric shell 130, and layer 131 may hold the water barrier under the applied pressure, as disclosed below with respect to FIG. 13. In some embodiments, the entire water vapor transmission rate of biodegradable polymeric shell 130 may not exceed 50-800 [g/m$^2$ day] at 37° C. according to ASTM E-96 standard. Examples for shelled portions 130, 430, 520, 830, 840 and 900 that includes shell 130 are illustrated in FIGS. 3, 4, 5, 8, 9 and 12.

An exemplary first layer 131 may include polyester with 20 weigh % thermoplastic starch and 0.5 weight % $C_{54}H_{105}FeO_6$(FeSt OXO). Such a composition may form a water barrier with good impact and strength properties. However, due to the relatively low starch content, such a layer may only have a medium biodegradability.

Second layer 132 may include a polymeric matrix and filler. The filler may include polysaccharides, for example, being at least 40 weight % from the total weight of layer 132. The polysaccharides may be starch, cellulose, lignin, chitin or a combination thereof. The matrix may include polymers, for example, polyesters, polyethylene, or the like. Second layer 132 may be configured to enhance the biodegradation of shell 130, by providing more nutritious materials for the bacteria, fungus or other microorganisms to consume. The polysaccharides in layer 132 may supply the nutritious materials. In some embodiments, first layer 132 may have a thickness of at least 20 μm, for example, 40 μm, 60 μm or more.

In some embodiments, second layer 132 may further include an additive configured to accelerate disintegration of the polymeric shell when exposed to natural day light. Such an additive may include pro-oxidative additives (also known as OXO additives), as discussed herein.

In some embodiments, adding large amounts of polysaccharides may reduce the mechanical strength of the layer and may further made the layer highly hydrophilic. Therefore, although having very good biodegradation properties, second layer 132 may not form by itself a container for holding water based solutions.

In some embodiments, biodegradable shell 130 may further include a third layer 133. Layer 133 may be located at the other side of layer 132 not being attached to layer 131 (as illustrated) such that second layer 132 is covered by layers 131 and 133 from both sides. Layer 133 may be configured to form a water barrier when in contact with water. The water barrier may last at least 3 hours, 6 hours, ½ a day, one day, 2 days, 5 days, one week or more. Layer 133 may include a polymer matrix and filler. The polymer may include, for example, polyester, polyethylene, or the like and the filler may include polysaccharides, for example, starch, cellulose, lignin, chitin or any combination thereof. In some embodiments, the first layer may include up to 50 weight % of polysaccharides, for example, 40%, 30%, 25% and 10%. In some embodiments, the first layer may include at least 10%, 20% or 25% polysaccharides. In some embodiments, first layer 133 may have a thickness of at least 5 μm, for example, 20 μm.

Third layer 133 may be configured to block water molecules from passing through polymeric shell 130. For example, when shell 130 is included in a container for holding water, third layer 133 may allow less than 10% of the water held in the container to evaporate from the container during one week. The three-layer structure of shell 130 may be configured to prevent water and moisture to be in contact with hydrophilic layer 132. In some embodiments, shell 130 may include more than three layers.

In some embodiments, biodegradable shell 130 may have a tensile strength of at least 10 MPa, for example, 15 MPa, 20 MPa, 30 MPa or more. In some embodiments, biodegradable shell 130 may have an elongation at break of at least 100%, 200%, 300%, 400% or more. In some embodiments, first layer 131 may provide in addition to being a water barrier also the tensile strength required by the various applications in which polymeric shell 130 is to be used. For example, the strength required to hold water in a container made from shell 130.

In some embodiments, the thicker layer 131 is the stronger shell 130 may be. Shell 130 having first layer 131 thicker than second layer 132 may have higher tensile strength than a shell having first layer 131 thinner than second layer 132 or having the same thickness. For example, for the same total thickness (e.g., 100 μm) shell 130 that includes layers thickness ratios of 60% layer 131 (e.g., 60 μm) and 40% (e.g., 40 μm) layer 132 may be stronger than shell 130 having 50% (e.g., 50 μm) of each layer. When adding an additional third layer, such as layer 133 having similar or close properties to layer 131, the strength may further increase. Accordingly, a three-layered shell having the following thickness ratios: 30% layer 131, 40% layer 132 and 30% layer 133 may have higher tensile strength than a three-layered shell having thickness ratios: 25% layer 131, 50% layer 132 and 25% layer 133 (for the same total thickness). In some embodiments, the total thickness of shell 130 and the thickness ratio between the first, second and optionally third layer may be determined according to the final required tensile strength. For example, the tensile strength required by a water (or other liquid or granular substance) container, such as the shelled portion of FIG. 13.

Figure 13:
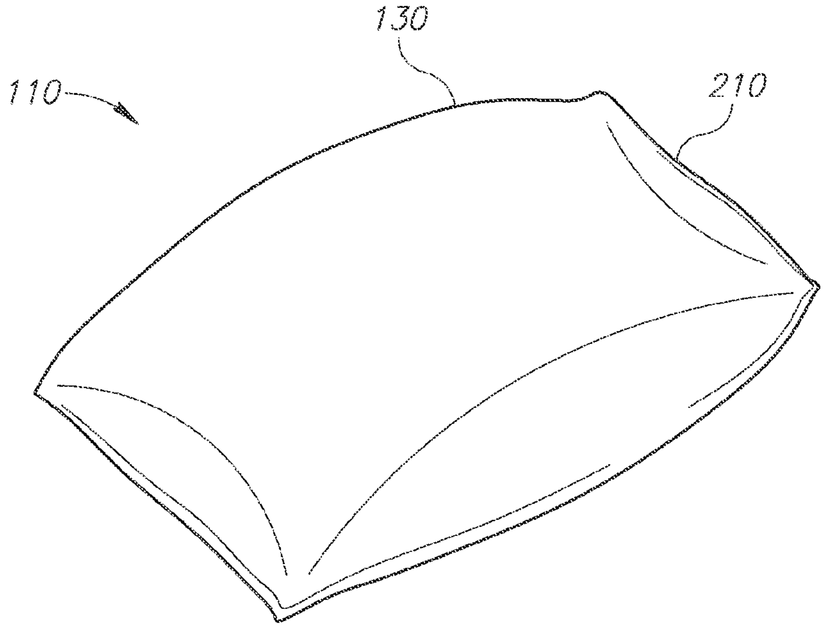
FIG. 13 is an illustration of a shelled portion according to some embodiments of the invention.

Reference is now made to FIG. 13 that is an illustration of a shelled portion 110 for holding water based solutions according to some embodiments of the invention. Shelled portion 110 may be made from biodegradable shell 130. Shelled portion 110 may include sealing 210. Sealing 210 may be strong enough to hold the water or other liquids inside shelled portion 110 without braking or water evaporation. Shelled portion 110 may be sealed such that no more than 10 weight % of the water held in the container may evaporate during, one day, 2 days, 5 days, one week or more. Shelled portion 110 may have a variety of sizes, each designed to hold different amount of liquids. Shelled portion 110 may be designed to hold liquids from 1 milliliter (ml)-100 liter (l) or more. For example, 10 ml, 50 ml, 100 ml, 200 ml, 500 ml, 1 liter, 5 l and 10 l.

In some embodiments, the strength of shelled portion 110 may be such that, when a plurality of shelled portions 110 are piled together, for example, in a tank, both shell 130 and sealing 210 may hold the water/liquid/granular substance inside each one of the plurality of shelled portions 110. For example, the strength of shell 130 and sealing 210 may be such that shelled portion 110 having a volume of 200 ml. filled with water/liquid/granular substance can endure a compression pressure applied on the filled shelled portions by an external load of at least 30 kg, 40 kg, 50 kg or more.

In some embodiments, biodegradable polymeric shell 130 and shelled portion 110 may be configured to undergo a biodegradation on the ground responsive to an exposure to free air and natural day light, during no more than 24 months, for example, during no more than 18 months, during no more than 12 months or during no more than 6 months. Biodegradable polymeric shell 130 and shelled portion 110 may undergo the biodegradation to environmentally harmless materials according to at least one of: ISO 20200, ASTM 6400, ISO 14855 and EN13432. For example, shell 130 and shelled portion 110 left on the ground in the free air may undergo a biodegradation by bacteria and/or fungus located in the soil to produce $CO_2$, water and biomass.

In some embodiments, when placed in a fire (either intentionally or unintentionally) shell 130 and shelled portion 110 may be configured to be burned in the fire without emitting hazardous gasses. As used herein, hazardous gasses may include gases that are harmful to humans when inhaled or ingested in various quantities. Additionally, hazardous gasses may further include gases that may continue burning or may explode. For example, incomplete burning may lead to the emission of toxic CO, adding various chemicals to the polymeric matrix in at least one of layers 131, 132 or 133 may result in emitting other harmful gases. Accordingly, shell 130 and shelled portion 110 may include only materials that can be fully burned to form $CO_2$ (in the open air) and not emit any other toxic or hazardous gasses.

Experimental Results

Experiments were conducted using biodegradable polymeric shells having structure and composition as listed in Table 1:

TABLE 1

| Layer | Thickness | Composition |
|---|---|---|
| A | 15 μm | 99.4% biodegradable polyester with 20% starch, 0.5% photo accelerator (Fe(III)St) + 0.1% slip (erucamide) |
| B | 40 μm | Biodegradable polyester with high quantity of starch (over 5.0%) |
| C | 15 μm | 99.5% biodegradable polyester with 20% starch, 0.5% photoaccelerator (Fe(III)St) |

Tensile Test

Tensile tests were conducted to the biodegradable polymeric shells having the structure disclosed in Table 1. The biodegradable polymeric shells were tested 7 times in two directions: machine direction (MD—the extrusion direction) and transverse direction (TD). The mean stresses at maximum load and the stain at the breaking point are given in Table 2: The tests were conducted at a temperature of 23° C., 50% humidity, full scale load of 0.5 kN and crosshead speed of 500 mm/min

TABLE 2

| | MD | | TD | |
|---|---|---|---|---|
| | Stress at Max load (MPa) | Strain at Break (%) | Stress at Max load (MPa) | Strain at Break (%) |
| Mean | 15.2 | 652 | 12.5 | 591 |
| Standard deviation | 0.4 | 13 | 0.2 | 41 |

As can clearly be seen, the mean stress at the maximum load in both directions is higher than 10 MPa, and the strain or elongation at the breaking point is much higher than 100%.

On the Ground Biodegradation Test

The biodegradable polymeric shells having the structure disclosed in Table 1 were tested for biodegradation on the ground responsive to an exposure to free air and natural day light. Shells 310 were made from paper, shells 320 were made from the same biodegradable polymeric shells disclosed above, and shells 330 were the same shells as shells 320 after being soaked in river water for 1 hour. As can clearly be seen, all the biodegradable polymeric shells were disintegrated and at least partially degraded after 63 days, while the paper shells stayed the same. As expected, when adding even small amounts of water, the biodegradability of the shells increases.

Water Transmission Tests

The water vapor transmission of two samples of the biodegradable polymeric shells having the structure disclosed in Table 1 was tested. The water vapor transmissions of both samples were 376 g/($m^2$·day) and 327 g/($m^2$·day). Both samples ha water vapor transmissions of less than 380 g/($m^2$·day).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method of delivering shelled portions containing effective ingredients, over the air to a target, the method comprising:

loading the required effective ingredients onto a vehicle in the form of shelled portions selected to have a type and size based on mission parameters and physical data of a scene containing the target;

conveying the shelled portions in the vehicle to a delivery point, based on the mission parameters and the physical data; and ballistically delivering the shelled portions from the vehicle towards the target, wherein the shelled portions comprise the effective ingredients covered by flexible biodegradable shells, and wherein each of the biodegradable shells comprises:

a first layer comprising polysaccharide at a weight % of up to 50% and a polymer matrix, the first layer being configured to form a water barrier when in contact with water;

a second layer comprising a polysaccharide at a weight % of at least 40% and a polymer matrix; and a third layer comprising polysaccharide at a weight % of up to 50%, a polymer matrix and an additive configured to accelerate disintegration of the polymeric shell when exposed to natural day light, the third layer being configured to form a water barrier when in contact with water.

2. The method according to claim 1, further comprising deriving physical data associated with the scene which includes the target from one or more sources, wherein at least some of the sources are independent of each other.

3. The method according to claim 1, wherein the shelled portions are homogeneous in size and weight.

4. The method according to claim 3, wherein the vehicle is an aerial vehicle, the method further comprising controlling the footprint of the shelled portions at the target by selecting mission parameters including the height and speed of the vehicle at the delivery point.

5. The method according to claim 1, further comprising targeting the delivering of the shelled portions towards the target using optical targeting means that predicts impact area for the shelled portions at any given time.

6. The method according to claim 1, wherein the biodegradable shell has a water vapor transmission rate of the bio-degradable polymeric shell is between 50-800 [g/m$^2$ day] at 37° C. according to ASTM E-96.

7. The method according to claim 1, wherein the shelled portions comprise a shell that is configured to break prior to impact with the target so as to release at least some of the effective ingredients prior to the impact with the target.

8. The method according to claim 1, wherein the shelled portions contain two or more substances that are arranged to interact upon hitting the target or prior to the hitting due to rotational forces.

9. The method according to claim 1, wherein the shelled portions contain two or more substances, and wherein one of the two or more substances is arranged to generate a gaseous substance or foam upon impact at target or prior to the impact.

10. The method according to claim 1, wherein the ballistically delivering is carried out by an aerial vehicle.

11. The method according to claim 10, wherein different types of shelled portions are loaded onto the vehicle, wherein the selecting is carried out during flight of the aerial vehicle.

12. The method according to claim 10, wherein the loading is performed using a dispenser that is arranged to fit into a plurality of types of aerial vehicles.

13. The method according to claim 1, wherein ballistically delivering the shelled portions is carried out using a dispenser that comprises a conveyer and a container that contains the shelled portions, wherein the dispenser is configured to accelerate the container along the conveyer and then bring the container to a complete and sudden stop so as to force the shelled portions ballistically out of the container.

14. The method according to claim 1, wherein each one of the shelled portions includes holes going through the shell and tilted fins located at one end of the shell designed such that during the ballistic delivery, wherein the shelled portions rotate around their longitudinal axis at an increasing angular speed which results in the fluid exiting the shelled portion.

15. A system for delivering over the air, shelled portions of fluids or granular substances containing effective ingredients to a target, the system comprising:

a vehicle configured to convey the shelled portions to a delivery point based on mission parameters and physical data; and a dispenser configured to ballistically deliver the shelled portions towards the target, wherein the shelled portions comprise fluids or granular substances covered by biodegradable shells that provide the shelled portions a ballistic coefficient that is significantly higher than a ballistic coefficient of similar portions without the shells, and wherein each of the biodegradable shells comprises:

a first layer comprising polysaccharide at a weight % of up to 50% and a polymer matrix, the first layer being configured to form a water barrier when in contact with water;

a second layer comprising a polysaccharide at a weight % of at least 40% and a polymer matrix; and a third layer comprising polysaccharide at a weight % of up to 50%, a polymer matrix and an additive configured to accelerate disintegration of the polymeric shell when exposed to natural day light, the third layer being configured to form a water barrier when in contact with water.

16. The system according to claim 15, further comprising a computer processor configured to derive the physical data associated with a scene which includes the target.

17. The system according to claim 16, wherein the computer processor is further configured to obtain mission parameters containing at least one of: a required type of effective ingredients, the required density of the effective ingredients at the target, and a desired distribution footprint of the shelled portions at the target.

18. The system according to claim 15, further comprising means for optical targeting the delivering of the shelled portions towards the target so that the impact area for the shelled portions at any given time is predicted.

19. The system according to claim 15, wherein the bio-degradable shell has water vapor transmission rate of the bio-degradable polymeric shell is between 50-800 [g/m$^2$ day] at 37° C. according to ASTM E-96.

20. The system according to claim 15, wherein the shelled portions comprise a shell that is configured to break or open prior to impact with the target so as to release at least some of the effective ingredients prior to the impact with the target.

* * * * *